United States Patent [19]
Parsons

[11] 3,738,206
[45] June 12, 1973

[54] QUICK RELEASE TOOL POST
[75] Inventor: Hubert J. Parsons, Horseheads, N.Y.
[73] Assignee: Hardinge Brothers, Inc., Elmira, N.Y.
[22] Filed: Mar. 22, 1971
[21] Appl. No.: 126,578

[52] U.S. Cl. ................................................ 82/37
[51] Int. Cl. ........................................ B23b 29/26
[58] Field of Search ........................ 82/36, 36 A, 37

[56] References Cited
UNITED STATES PATENTS
3,024,686   3/1962   Daugusta ........................... 82/36 A
3,494,229   2/1970   Judge .................................... 82/36
FOREIGN PATENTS OR APPLICATIONS
151,583   9/1955   Sweden ................................ 82/36
1,070,864   2/1954   France ................................. 82/36

Primary Examiner—Leonidas Vlachos
Attorney—Shlesinger, Arkwright & Garvey

[57] ABSTRACT

A quick release tool post for machine tools including a body having a pair of adjacent side faces, a recess formed in each of said adjacent faces for selectively receiving a tool holder, a clamp member at the intersection of the two adjacent faces and cooperating with the recesses for clamping a tool holder in at least one of the recesses, the clamp including a portion having a longitudinal axis substantially bisecting the angle formed by the two adjacent faces and passing through the body of the tool post, a handle associated with the clamp for imparting reciprocatory motion to the clamp along the longitudinal axis thereof, the handle being positioned for rotation about the longitudinal axis and constrained against reciprocation along the longitudinal axis. Also, a dust cover for the recesses of the tool post is disclosed.

18 Claims, 12 Drawing Figures

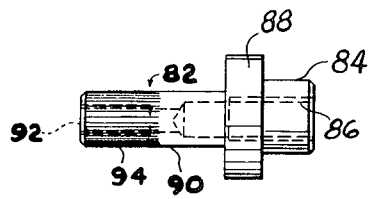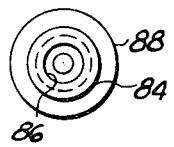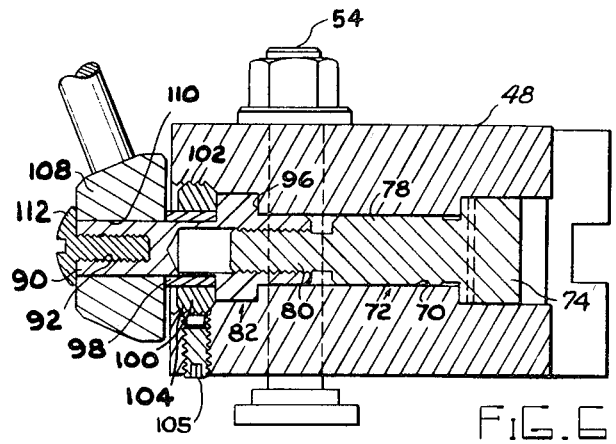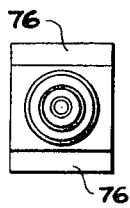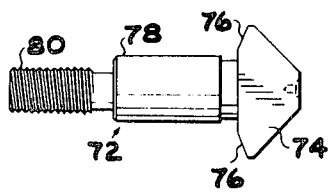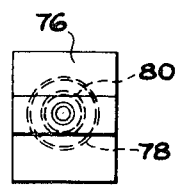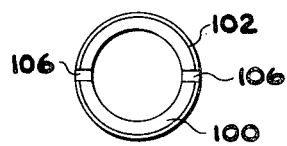

QUICK RELEASE TOOL POST

This invention relates to a quick release tool post for a machine tool, and more particularly to a quick release tool post which provides very high accuracy in repeatability.

BACKGROUND AND OBJECTS

In prior art tool posts, precision falls off rapidly with repeated use, because although the tool and tool holder must be held rigidly on the lathe by means of the tool post, especially when precision work is being done repeated clamping and unclamping of the tool and tool holder in the prior art devices creates play which causes large inaccuracies in the work.

The prior art is replete with a number of various arrangements for clamping the tool holder in the tool post, however most of these arrangements are either quite complex or lack precision repeatability. The complexity of the tool post serves to increase its initial cost, while its lack of precision repeatability reduces the quality of the article being produced on the lathe.

While a turret lathe can be used in rapidly perform a number of machining operations on a work piece in succession, the single station lathe is far less expensive; however, it can generally perform only one operation on the work piece before it becomes necessary to shut down the lathe to change the tool and/or tool holder. Thus, frequent changing of the tool holder requires a precision repeatable tool post to permit frequent changing of the tool without loss of accuracy.

Accordingly, a primary object of this invention is to provide a tool post of high precision and repeatability.

Another object of this invention is to provide a tool post which quickly releases the tool holder for changing the tool.

A further object of this invention is to provide a tool post which positively and rigidly clamps a tool holder.

Still another object of this invention is to provide a tool post wherein the clamping member is positively moved to a release position when actuated.

Still a further object of this invention is to provide a tool post which may carry two tool holders simultaneously for selective use.

Yet a further object of this invention is to provide a tool post of economical and durable construction.

Still another object of this invention is to provide a tool post having a dust cover for the tool holder receiving recesses.

Still a further object of this invention is to provide a dust cover for a tool post.

Yet another object of this invention is to provide a tool post having a plurality of mounting holes for rigidly mounting the tool post.

DESCRIPTION OF THE DRAWINGS

These and other objects and advantages of this invention will become apparent when considered in light of the following specification and claims when viewed in light of the drawings in which:

FIG. 6 is a section along lines 6—6 of FIG. 1 and viewed in the direction of the arrows;

FIG. 7 is a side elevation view of one of the components of the tool post;

FIG. 8 is an end view thereof;

FIG. 9 is a top plan view of one of the components of the tool post of this invention;

FIG. 10 is a left side view thereof;

FIG. 11 is a right side view thereof; and

FIG. 12 is an elevational view of another of the components of the tool post of this invention.

DESCRIPTION OF THE INVENTION

Figure 1:
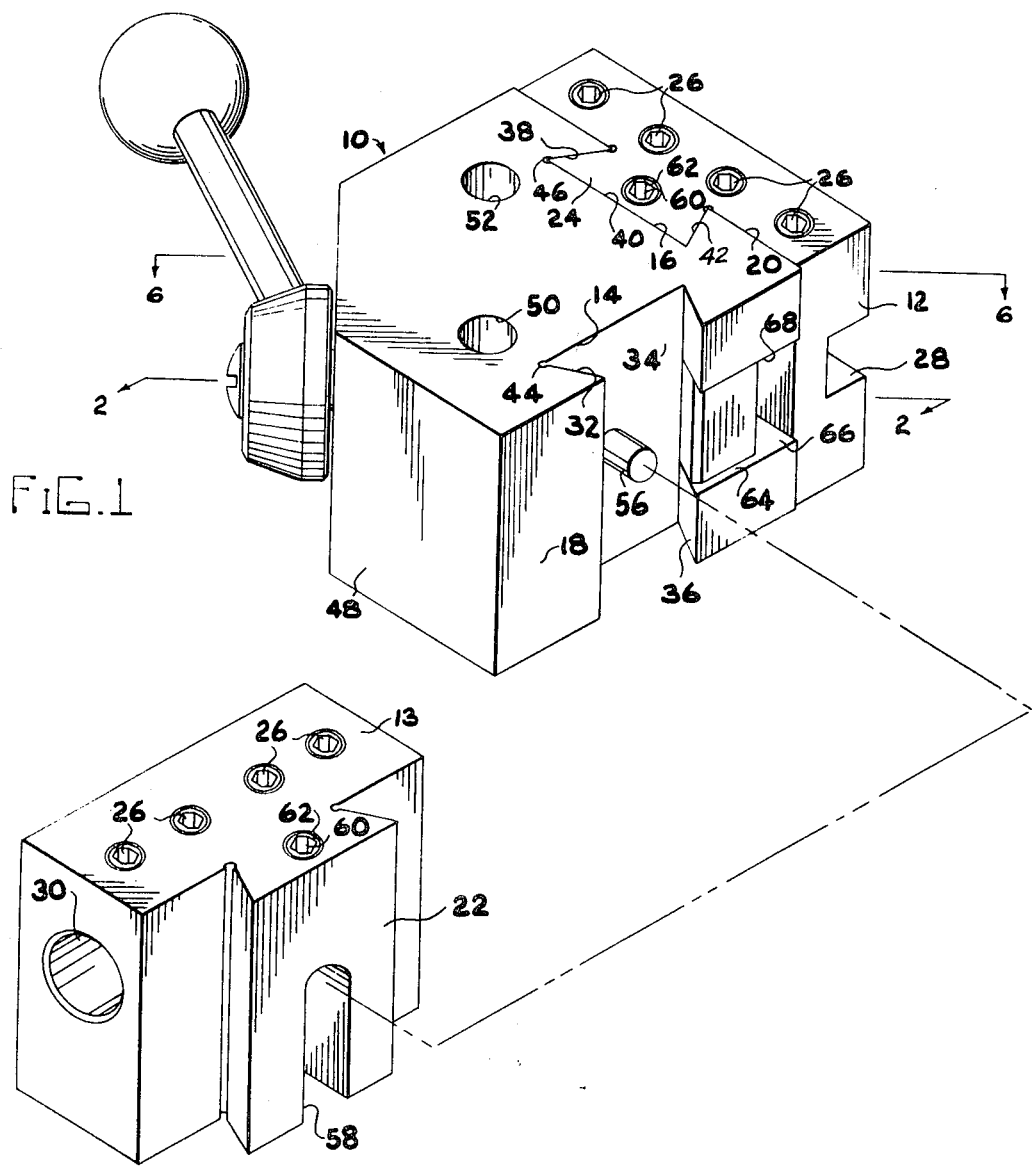
FIG. 1 is an exploded perspective view of the tool post of this invention.

Referring now to FIG. 1, the tool post generally designated 10 is seen to include tool holders 12 and 13 of the type known in the art. Tool post 10 includes a pair of dove-tail recesses 14 and 16 formed in two adjacent faces 18 and 20 thereof.

Tool holders 12 and 13 include dove-tail projections 22 and 24. Projections 22 and 24 are of a size so as to fit snugly within recesses 14 and 16. Although two tool holders 12 and 13 are shown, it is not necessary to use the two tool holders simultaneously, as a good clamping action results whether one or two holders are used.

Tool holders 12 and 13 each include a plurality of set screws 26 which are used to clamp a tool (not shown) in openings 28 and 30 in the usual manner.

Recess 14 is seen to include side walls 32, 34 and 36, while recess 16 includes side walls 38, 40 and 42. The corner formed by the intersection of walls 32 and 34 has a relief 44 formed therein, while the corner between walls 38 and 40 has a similar relief 46 formed therein. Reliefs 44 and 46 would serve to prevent any small particles of foreign material such as dust, metal scraps and the like from interfering with the repeatability of use of the tool post 10. Any particle which might enter the recesses 14 and 16 would be swept into the reliefs 44 and 46 so as not to interfere with the seating of the tool holders 12 and 13.

Tool post 10 is seen to include the body 48 having a pair of tool post mounting holes 50 and 52. Mounting holes 50 and 52 receive the T-shaped bolt 54 as seen in FIG. 6 for mounting the tool post in the T-slots on the tool slide of a lathe in the well known manner. In the prior art, however, only one mounting hole has been provided, while in the present invention two mounting holes, 50 and 52, are provided. Thus, if the tool holders 12 and 13 are to be used in recess 14, the tool post 10 may be mounted by means of a bolt in mounting hole 50. In this manner, the mounting bolt is positioned close to the tool holder 12 or 13 and serves to more rigidly hold the tool holder 12 or 13. In a similar manner, if the tool holder 12 or 13 is to be mounted in recess 16, the too post 10 may be mounted by means of mounting hole 52 which is positioned adjacent recess 16. Clearly, however, mounting holes 50 could be used in conjunction with recess 16 and mounting 52 used in conjunction with recess 14, if desired.

Within each of the recesses 14 and 16, a projection or stud 56 is provided. Each of the tool holders 12 and 13 includes on its corresponding projection 22 and 24 a cutout 58 which passes around the stud 56. The set screw 60 is adjustable in a threaded bore 62, a lower end of the set screw 60 contacts the stud 56. In this manner, the vertical position of the tool holder 12 or 13 may be adjusted within the recess 14 or 16.

Figure 2:
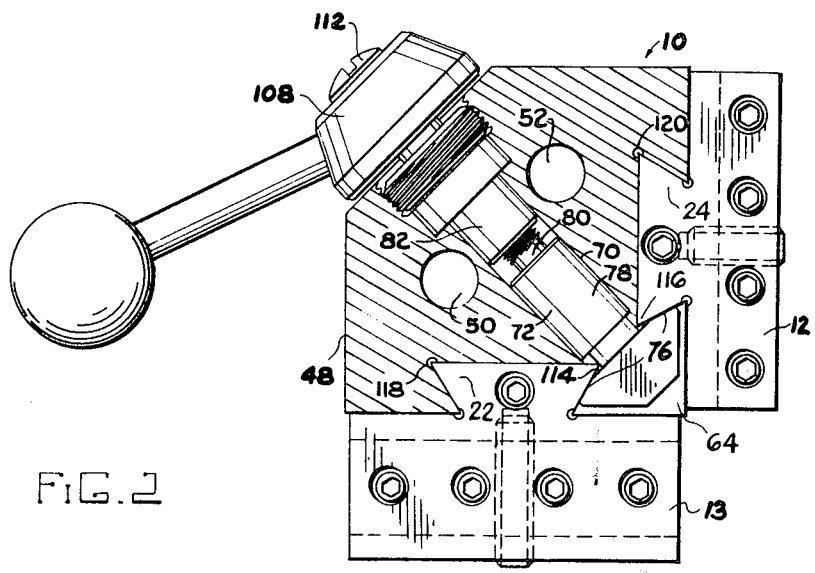
FIG. 2 is a section along lines 2—2 of FIG. 1 and viewed in the direction of the arrows.

Body 48 of tool post 10 is seen to include a cutout portion 64 formed by bottom surface 66 and top surface 68. Extending from cutout portion 64, as seen in FIG. 2, is a bore 70. Bore 70 extends in a direction so as to substantially bisect the angle formed by faces 18 and 20 of tool post 10. Positioned within bore 70 is a clamp member 72 as seen in FIGS. 2 and 9–11. Clamp member 72 is seen to include a head portion 74 having clamping surfaces 76. Clamp member 72 further includes a shank portion 78 which is threaded as at 80. The threads 80 of clamp member 72 are threaded into the tubular member 82 as best seen in FIGS. 2 and 6–8. Member 82 includes a forward portion 84 internally threaded as at 86 and an annular flange portion 88. Member 82 also includes a rear portion 90 which is internally threaded at 92. On the exterior surface or portion 90 are splines as indicated at 94.

Referring now to FIG. 6, the assembly of the tubular member 82 with the clamp member 72 will be explained. The clamp member 72 is placed in the bore 70 in the position shown, its head portion 74 fitting into the cutout portion 64 to prevent rotation and the tubular member 82 is placed in the rear portion of the bore 70 and turned so as to threadedly engage the threads 80 of the clamp member 72. In this manner, flange 88 is brought into abutting contact with shoulder 96 in body 48. The rear portion 90 of tubular member 82 is seen to project rearwardly from the body 48. A bushing 98 is next placed over rear portion 90 of tubular member 82 so as to contact the annular flange 88. A nut 100 having external threads 102 is positioned around bushing 98 and threaded into the threaded bore 104 in body 48 by means of notches 106 engagable by a suitable wrench (not shown) until it contacts the annular flange portions of tubular member 82. In this manner, nut 100 serves to prevent tubular member 82 from shifting axially within the body 48. The nut 100 is prevented from loosening by set screw and brass plug 105.

Finally, a handle member 108 having splined internal bore 110 is positioned over splined portion 94 of tubular member 82, and is secured thereto by means of a screw 112 threaded into bore 92.

OPERATION OF THE INVENTION

In operation, either one or both of tool holder 12 and 13 are positioned in either recesses 14 and 16 in the usual manner. Next, handle member 108 is rotated about the common longitudinal axis of clamp member 72 and tubular member 82 so as to rotate the tubular member 82 with respect to the clamp member 72. Since tubular member 82 is restrained from axial movement by means of nut 100, the clamp member 72 is drawn inwardly of the body 48 of tool post 10. In this manner, clamping surfaces 76 of clamp member 72 are forced against surfaces 114 or 116 of tool holders 12 or 13, thus forcing projections 22 and 24 of tool holders 12 or 13 into the corners 118 or 120 of recesses 14 and 16. Thus, the tool holders 12 and 13 are securely clamped in position on the tool post 10.

To release either of the tool holders 12 or 13, the handle 108 is rotated in the opposite direction, and since the tubular member 82 is still prevented from shifting axially, the clamp member 72 is positively forced out of engagement with surfaces 114 and 116 of tool holders 12 and 13. In this manner, even a small angle of rotation of handle member 108 quickly releases the clamping of the tool holders 12 and 13 to permit rapid changing thereof.

It has been found that the accuracy of the tool post of this invention far surpasses that of most prior art tool posts and the positioning of the tools is repeatable to approximately 20 millionths of an inch. This provides a vast improvement over prior art tool posts, especially where precision work is being done.

Figure 5:
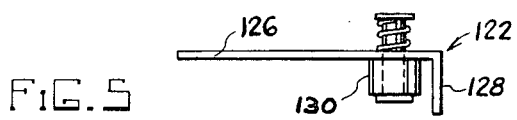
FIG. 5 is a top plan view of the dust cover of this invention.
Figure 4:
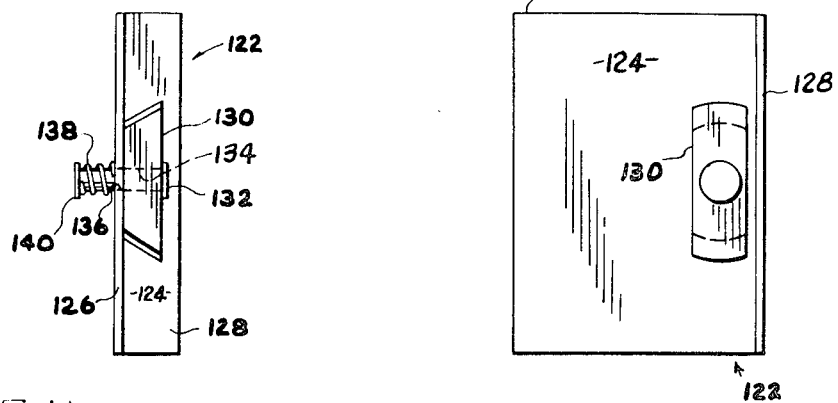
FIG. 4 is a side elevation of the dust cover of this invention.
Figure 3:
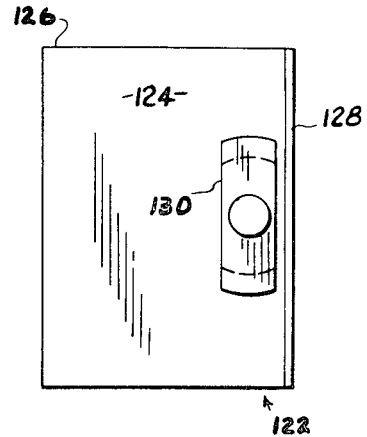
FIG. 3 is a plan view of the dust cover of this invention.

With reference now to FIGS. 3–5, the dust cover of the present invention is illustrated. The dust cover generally designated 122 is seen to comprise an L-shaped plate 124 of suitable material and having a long leg 126 and a short leg 128. Positioned on the long leg 126 of the L-shaped plate 124 is a wedged shaped projection 130 having the configuration shown in the drawings. A rivet, screw or other suitable fastener 132 passes through bores 134 and 136 in projection 130 and plate 124 respectively. A spring 138 is provided around fastener 132 between the head 140 and the front of the plate 124 so as to bias the fastener 130 to the left as seen in FIG. 4. This serves to urge the projection 130 toward the plate 124. Projection 130 is of a cross-section similar to projections 22 and 24 on tool holders 12 and 13, to permit the projection 130 to be slideable into recesses 14 or 16. When the projection 130 is positioned in the rear of recesses 14 or 16, the spring 138 serves to hold the projection 130 in engagement with the recesses 14 and 16 and in this manner, hold the dust cover 122 in position on the tool post 10. The L-shape of the dust cover 122 prevents dust from entering the recesses 14 or 16, in that the short leg 128 covers the top of the recesses 14 or 16, while the long leg 126 covers the front face of the recesses 14 or 16. Thusly, when only one of the recesses 14 or 16 is used for holding a tool holder 12 or 13, the other recess 14 or 16 may be protected from foreign matter entering thereinto. Similarly, when the tool post 10 is removed from the lathe, a dust cover may be provided over each of the recesses 14 and 16 to keep dust out of the recesses during storage of the tool post 10.

While this invention has been described, it will be understood that it is capable of further modification, and this application is intended to cover any variations, uses and/or adaptations of the invention following in general, the principle of the invention and including such departures from the present disclosure as come within known or customary practice in the art to which the invention pertains, and as may be applied to the essential features hereinbefore set furth, as fall within the scope of the invention or the limits of the appended claims.

What I claim is:

1. A quick release tool post for machine tools including:
   a. a body having at least a pair of adjacent faces,
   b. a recess formed in each of said adjacent faces for selectively receiving a tool holder,
   c. clamp means having a head portion and a shank portion and positioned at the intersection of said adjacent faces and cooperating with said recesses for clamping a tool holder in at least one of said recesses,
   d. said head portion of said clamp means extending from one of said recesses to the other of said recesses and including clamping surfaces substantially coincident with wall portions of said recesses, e. said shank portion having a longitudinal axis substantially bisecting the angle between said adjacent faces and passing through said body, f. handle means associated with said shank portion and being rotatable about said longitudinal axis and constrained against reciprocation along said longitudinal axis, g. said handle means including a tubular member having an annular flange intermediate the ends thereof, h. one end of said tubular member threadedly engaging said shank portion, i. a bore in said body and said flange being positioned in said bore, and j. means for securing said tubular member in said body.

2. A quick release tool post as in claim 1 wherein:
a. said recesses have a dovetail configuration.

3. A quick release tool post as in claim 2 and wherein:
a. the corner of each of said recesses opposite said clamping surfaces includes a relief formed in said corner.

4. A quick release tool post as in claim 2 and wherein:
a. said longitudinal axis is substantially perpendicular to said dove-tail recesses.

5. A quick release tool post as in claim 1 and including:
a. a pair of tool post mounting bores passing through said body substantially parallel to said recesses,
b. one of said bores being adjacent to one of said recesses, and
c. the other of said bores being adjacent to the other of said recesses.

6. A quick release tool post as in claim 1 and wherein:
a. said recesses extend in a direction transverse to said longitudinal axis and are substantially parallel to each other.

7. A quick release tool post as in claim 1 and wherein:
a. each of said recesses have outside, inside, and bottom wall surfaces,
b. the inside wall surface of one recess of said pair being adjacent the inside wall surface of the other recess of said pair,
c. a slot interconnecting said inside wall surface, and
d. said head portion being positioned in said slot.

8. A quick release tool post as in claim 7 and wherein:
a. said slot includes top and bottom surfaces,
b. said head portion includes top and bottom surfaces,
c. said top and bottom surfaces of said slot and said top and bottom surfaces of said head portion cooperating so as to constrain said clamp means against rotation.

9. A quick release tool post as in claim 8 and wherein:
a. said top and bottom surfaces of said slot and said top and bottom surfaces of said head portion are substantially planar.

10. A quick release tool post as in claim 1 and wherein:
a. said head portion includes a pair of side surfaces, b. one of said head portion side surfaces being substantially parallel to one of said adjacent faces,
c. the other of said head portion side surfaces being substantially parallel to the other of said adjacent faces,
d. each of said side surfaces being spaced inwardly from its respective adjacent face,
e. thereby forming an operating clearance between said head portion and a tool holder.

11. A quick release tool post as in claim 1 and including:
a. cover means in one of said recesses.

12. A quick release tool post as in claim 11 and wherein:
a. said cover means includes a cover member,
b. a projection on said cover member engageable with said one of said recesses for securing said cover member on said tool post.

13. A quick release tool post as in claim 12 and wherein:
a. said cover member has a substantially L-shaped configuration,
b. said projection is positioned on the long leg of said L, and
c. spring means for biasing said projection toward said cover member.

14. A quick release tool post as in claim 13 and including:
a. fastener means passing through said projection and said cover member, and
b. said spring means includes a coil spring around said fastener means.

15. A quick release tool post for machine tools including:
a. a body having at least a pair of adjacent side faces and top and bottom surfaces,
b. a recess formed in each of said adjacent faces for selectively receiving a tool holder,
c. means at the intersection of said pair of adjacent faces for clamping a tool holder in at least one of said recesses,
d. said clamping means including a clamp member having a head portion and a shank portion and having clamping and release positions,
e. said body having a cutout portion intermediate said top and bottom surfaces and extending from one of said recesses to the other of said recesses,
f. a bore extending through said body from said cutout portion and having longitudinal axis substantially bisecting the angle formed by said adjacent faces,
g. said head portion being positioned in said cutout,
h. said shank portion being positioned in said bore,
i. nut means positioned in said bore and secured against axial movement in said bore and threadedly engaging said shank portion, and
j. means for rotating said nut means,
k. whereby upon rotation of said nut means, said clamp member is moved axially in said bore between said clamping and release position.

16. A quick release tool post as in claim 15 and wherein:
a. said cutout portion and said head portion have cooperating surfaces,
b. said cooperating surfaces preventing rotation of said clamp member.

17. A quick release tool post as in claim 15 and wherein:
  a. said head portion includes clamping surfaces forming a portion of the sides of said recesses, and
  b. the corner of each of said recesses opposite said clamping surfaces includes a relief formed in said cover.

18. A quick release tool post as in claim 15 and wherein:
  a. said recesses have a dove-tail configuration,
  b. said recesses extend in a direction transverse to said longitudinal axis and are substantially parallel to each other.

* * * * *